United States Patent Office 3,035,305
Patented May 22, 1962

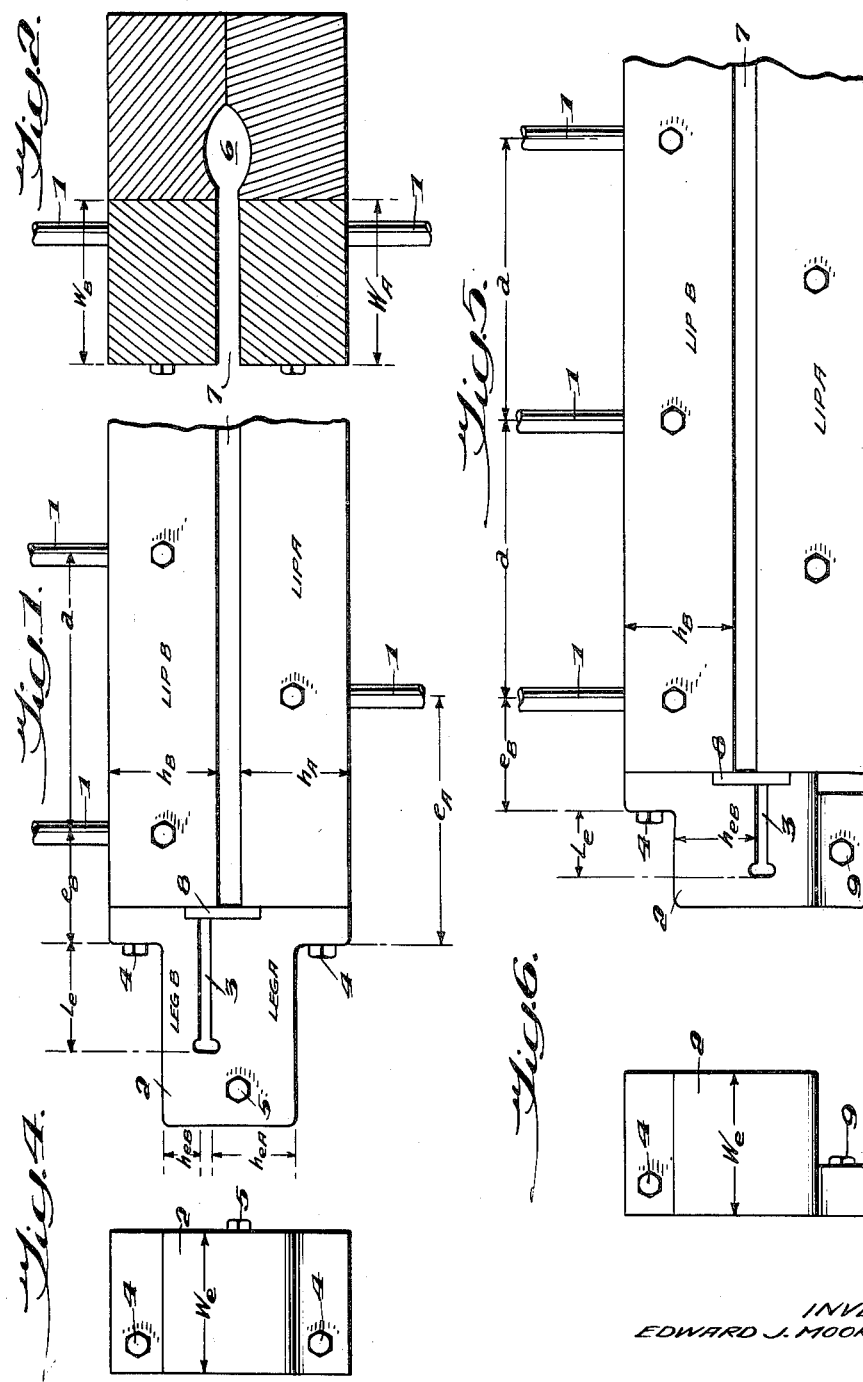

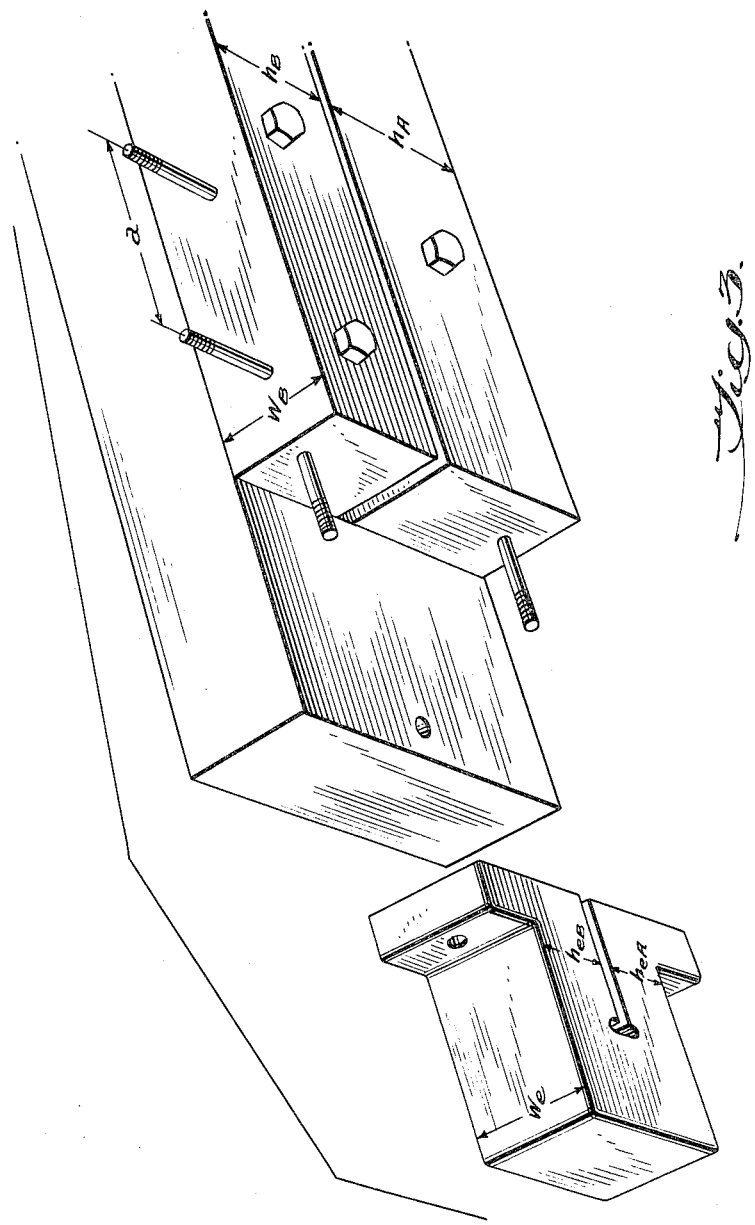

3,035,305
FILM EXTRUSION APPARATUS
Edward J. Moore, Buffalo, N.Y., assignor to E. I. du Pont de Nemours and Company, Wilmington, Del., a corporation of Delaware
Filed Nov. 4, 1960, Ser. No. 67,263
11 Claims. (Cl. 18—12)

This invention relates to film extrusion apparatus. More particularly, this invention relates to film extrusion apparatus, having lips of uniform sensitivity to adjustment along their lengths.

The manufacture of films or sheets is commonly carried out by the extrusion of a suitable substance, e.g., viscose composition, through an elongated orifice into a coagulating and/or regenerating bath to form a continuous film. Usually, the orifice is formed by the space between two elongated metal plates called "lips" or "lip members" which are positioned at the bottom of the extrusion apparatus and which during the film extrusion operation remain submerged in the coagulating and/or regenerating liquid. One or both of these lips have means by which their position, relative to each other, can be adjusted to regulate the thickness of the film material. In order to obtain satisfactory films, it is necessary to provide the lips with a large number of individually operative adjustment devices along the length thereof. In particular, the adjustment devices at the extremities of the lips must be adjusted to compensate for non-uniform shrinkage of the regenerated cellulose film. The cross section of the lips is such that with pressure and with temperature changes, the contraction or expansion causes a deformation of one lip to be greater than the other. The lip cross section does not easily lend itself to uniform adjustment and requires that external forces be applied in the manner that warps the extrusion edge of the lips. Lips can be sprung or damaged if adjustments are carried too far at any one point.

The adjustment devices at the unrestrained ends of the lips generally have a sensitivity of about twice that of similar adjusters placed anywhere else along the lips. Adjusters removed from the end have a higher rigidity (and, consequently, a lower sensitivity) because they have support on both sides. This greater sensitivity of the end adjusters causes an obvious detrimental effect on control of film gauge. If it were desirable to use an automatic gauge control mechanism to uniformly actuate the adjusters, it would be necessary to either specially regulate the impulses to the end adjusters or experience the consequent gauge irregularity caused by their high sensitivity.

A further problem experienced with known film extrusion apparatus is that the forward lip movement is not colinear with reverse lip movement because of static friction between the lip and the body section. This adjustment lag is more pronounced at the end of the lip than at a center section. Nonlinearity of adjustment can be more detrimental to adjustability than is variable sensitivity.

It is, therefore, an object of this invention to provide an extrusion apparatus having uniform sensitivity of the lip adjusters. Another object is to provide such an apparatus having improved linearity of lip movement. A further object is to provide such an apparatus capable of producing uniform gauge film. A still further object is to provide such an apparatus more suitable to automatic control of the lip adjustment devices. Still other objects will appear hereinafter.

These and other objects are accomplished by the instant invention which relates to a film extrusion apparatus comprising a body section, at least two opposite orifice defining lips, at least one of which is slidable, a plurality of means for differentially adjusting said slidable lips equally spaced along its length to regulate the contour of said orifice and means for defining the extremities of said orifice comprising a pair of end blocks, the improvement which consists in each of said end blocks having two legs, one being connected to the extremity of said slidable lip and the other leg being connected to the opposite lip (which may also be slidable), each leg of said end block connected to said slidable lip dimensioned by the formula:

$$\frac{L_e}{h_e} = \frac{a-e}{h_L}$$

wherein:

$L_e$ is the bending length of the leg,
$h_e$ is the height in the direction of bending of the leg attached to the slidable lip,
$h_L$ is the height in the direction of bending of the slidable lip,
$a$ is the distance between adjusting means, and
$e$ is the distance from the end adjuster to the effective end of the slidable lip, said end blocks having the same width perpendicular to the plane of bending as said slidable lip.

When only one lip is slidable the legs of the end blocks not attached thereto are attached to the opposite lip through the body section.

Where both lips are slidable and $e$, the distance from the end adjuster to the effective end of the lip, is the same for both lips, then, obviously, the height of both legs of the end block will be the same. Where the adjusters on the two lips are in a staggered relationship to each other, it is obvious that $e$ will not be the same for both lips and, further, the height of the legs of the end block will not be the same. Further clarification of this will be obvious from the drawings and the examples.

In the above formula the values of $e$, $a$, and $h_L$ may be different for each of two slidable lips thus producing a different $h_e$ for each leg of the end block.

The term used above, "effective end" of the slidable lip requires a fuller explanation. It will be seen in the drawings that the legs of the end block will usually have a flanged portion of the same height and width as the slidable lip. When these flanged portions are connected to the ends of the lip, being of the same material and dimensions, they will behave mechanically as an integral part of the lip. Therefore, the effective end of the lip will be the end of the flanged portion of the leg of the end block. Obviously, if the leg does not have the flanged portion described, then the effective end of the lip will be the actual end of the lip.

The term "bending length" of the leg refers to the portion of the leg exclusive of the flange used to affix the leg to the lip, if any. This term will be further clarified in the description of the drawings.

Although theoretically $L_e$ has no maximum or minimum limits, as a practical matter it will range from $0.25a$ to $a$, wherein, $a$, is the distance between adjusting means.

The invention will now be described with reference to the attached drawings wherein:

FIG. 1 is a plan view of one side of the bottom of an extruder showing two slidable lips.

FIG. 2 is a sectional view of the extruder in FIG. 1.

FIG. 3 is a perspective view of the extruder in FIG. 1 and the end block attached thereto.

FIG. 4 is a side view of the end block attached to the extruder in FIG. 1.

FIG. 5 is a plan view of one side of the bottom of an extruder showing one slidable lip.

FIG. 6 is a side view of the end block attached to the extruder in FIG. 4.

In FIGS. 1, 2, 3 and 4, the two slidable lips A and B are shown to have a plurality of equally spaced adjustment mechanisms 1 staggered along both lips. Suitable mechanisms are known to those skilled in the art. The distance between these adjusters is denoted by the letter, $a$, and the distance from the end adjuster on lip B, to the effective end of lip B is denoted by the letter, $e_B$. The corresponding distance on lip A is denoted, $e_A$. The height of the lips in the direction of bending is denoted by the letters, $h_A$ and $h_B$. (These correspond to $h_L$ in the formula previously given.) The width of the lips is denoted by the letters $w_A$ and $w_B$. The end block 2 comprises two legs, A and B, separated by slot 3. The legs are attached to the lips through their flanged portions by bolts 4. The end block is further fastened to the body section of the extruder by bolt 5. The height of the legs of the end block in the direction of bending is denoted by letters $h_{eA}$ and $h_{eB}$. The bending length of the legs of the end block is denoted by $L_e$. The plane of bending will be same as that of the paper on which the drawing is made.

The extrusion substance (not shown) is extruded from the reservoir 6 out through the elongated orifice 7.

The position of slot 3 is arbitrarily selected, preferably offset from the centerline of the orifice opening to maintain sealing pressure against gasket 8 which can be of any suitable material. The slot 3 extends from the interface of the legs with the lip ends to the hole at the back of the slot; it also extends for the entire width of the end block 2. The height of the slot is equal to or greater than the maximum orifice adjustment.

In FIGS. 5 and 6 like reference letters and numbers refer to like parts except that lip A in these figures is not slidable and has no adjusters. Further, it can be seen that the end block has a different design with only leg B connected in the same manner as in FIG. 1. The lower leg in FIGS. 5 and 6 is connected to the main body section by bolt 9. It is obvious that in an apparatus having two slidable lips the values of, $a$, may differ for each lip. Further, the adjusters along each lip may be exactly opposite each other, equally staggered or even unequally staggered.

For a given slidable extruder lip, the values of, $a$, the distance between adjusters; $e$, the distance from the end adjuster to the effective end of the lip; $h_L$, the height in the direction of bending of the slidable lip, will all be known. The value for $L_e$, the bending length of the leg attached to the slidable lip can be selected within the practical range of limits.

*Example I*

In an extruder having two slidable lips as depicted in FIG. 1 with equally spaced adjusters equally staggered along each lip the following are given:

$a = 6$ in.
$e_B = 2$ in.
$e_A = 5$ in.
$h_A = h_B = 4$ in.
$L_e$ is selected to be $\frac{1}{2}$ $(a - e_A) = \frac{1}{2}$ in.

It is desired to know the height of the legs of the end blocks ($h_{eA}$ and $h_{eB}$). Using the formula to solve for $h_{eA}$:

$$\frac{L_e}{h_{eA}} = \frac{a - e_A}{h_A} = \frac{1/2}{h_{eA}} = \frac{6-5}{6}$$

$h_{eA} = 2$ in.

Using the formula to solve for $h_{eB}$:

$$\frac{L_e}{h_{eB}} = \frac{a - e_B}{h_B} = \frac{1/2}{h_{eB}} = \frac{6-2}{4}$$

$h_{eB} = \frac{1}{2}$ in.

*Example II*

In an extruder having only one slidable lip (lip B) as depicted in FIG. 5 with equally spaced adjusters, the following are given:

$a = 6$ in.
$e_B = 2$ in.
$h_B = 6$ in.
$L_e$ is selected to be $\frac{2}{3}$ $(a - e_B) = 2\frac{2}{3}$ in.

It is desired to know the height of the end block leg attached to the slidable lip. Using the formula to solve for $h_{eB}$:

$$\frac{L_e}{h_{eB}} = \frac{a - e_B}{h_B} = \frac{8/3}{h_{eB}} = \frac{6-2}{6}$$

$h_{eB} = 4$ in.

End blocks were constructed using the dimensions calculated in the examples above and incorporated in actual film extrusion apparatus. It was found in every case that the adjusters next to the end block of this invention responded almost exactly as an adjuster in the center of the slidable lip. The nonlinearity of the end adjuster was reduced to that of a center adjuster.

One advantageous function of the novel end block, that of reducing the amount of separation due to internal pressure, was clearly demonstrated by comparing the end block of the present invention with a standard conventional end block. To produce a good edge on an extruded film at the end with a standard end block, the last two adjusters were adjusted to the opposite extremities of their range, whereas the corresponding adjusters at the end having the novel end block of this invention were adjusted by several nearly equal amounts in the same direction.

The flexible end block of this invention exerts a shearing force and a moment at the end of the slidable lip, decreasing the sensitivity of the end of the lip to the same degree as that at the center of the lip. This end block increases the resistance to deflection at the end of the lip by adding its own rigidity (resistance to deflection) to the lip such that the total rigidity at the end of the lip is equal to that at the center of the lip.

Thus, the end block of this invention simulates an infinitely long lip which not only improves the sensitivity and linearity of the end adjuster, but, more importantly, gives the end adjuster characteristics equivalent to the other lip adjusters.

The end block of this invention not only fulfills its primary function of defining the ultimate width of the extruded film and reducing separation of lip ends, but also provides an improvement in film extrusion apparatus making them far more easily controlled and adjusted so as to produce higher quality film more quickly and easily. This novel end block solves a problem which has long confronted the film industry. It is most beneficial where the deflection of the adjuster is a significant factor or multiple of the deflection of the lips, i.e., greater than 20 percent.

What is claimed is:

1. In a film extrusion apparatus comprising a body section, two opposite orifice defining lips, one of which being slidable, a plurality of means for differentially adjusting said slidable lip equally spaced along its length to regulate the contour of said orifice and means for defining the end extremities of said orifice comprising a pair of end blocks, the improvement which consists in each end block having two legs separated by a slot, one of said legs being connected to the extremity of said slidable lip and the other leg being connected to the opposite lip through said body section, both legs being interconnected at the ends opposite to the ends connected to said lips, the leg of said end block connected to said slidable lip being dimensioned by the formula:

$$\frac{L_e}{h_e} = \frac{a - e}{h_L}$$

wherein:

$L_e$ is the bending length of the leg, $h_e$ is the height in the direction of bending of the leg connected to said slidable lip, $h_L$ is the height in the direction of bending of the slidable lip, $a$ is the distance between adjusting means, $e$ is the distance from the end adjuster to the effective end of the slidable lip, said end blocks having the same width perpendicular to the plane of bending as said slidable lip.

2. Apparatus according to claim 1 wherein $L_e$ is from $0.25a$ to $a$.

3. Apparatus according to claim 1 wherein $$L_e = \tfrac{2}{3}(a-e)$$

4. In a film extrusion apparatus comprising a body section, two opposite orifice defining lips, each of said lips being slidable and having a plurality of means for differentially adjusting said lips along its length to regulate the contour of said orifice and means for defining the end extremities of said orifice comprising a pair of end blocks, the improvement which consists in each end block having two legs separated by a slot, one of said legs being connected to the extremity of one slideable lip, and the other leg being connected to the extremity of the opposite slideable lip, both legs being interconnected at the ends opposite to the ends connected to said lips, each leg being dimensioned by the formula:

$$\frac{L_e}{h_e} = \frac{a-e}{h_L}$$

wherein:

$L_e$ is the bending length of the leg, $h_e$ is the height in the direction of bending of the leg, $h_L$ is the height in the direction of bending of the lip connected to the leg, $a$ is the distance between adjusting means along the lip connected to the leg, $e$ is the distance from the end adjuster to the effective end of the lip connected to the leg, said end blocks having the same width perpendicular to the plane of bending as said lips.

5. Apparatus according to claim 4 wherein $L_e$ is from $0.25a$ to $a$.

6. Apparatus according to claim 4 wherein the distance between adjusters is the same along each lip.

7. Apparatus according to claim 4 wherein each lip has the same height in the direction of bending.

8. Apparatus according to claim 6 wherein the adjusters are evenly staggered along each lip.

9. Apparatus according to claim 8 wherein $$L_e = \tfrac{1}{2}(a - e_A)$$

wherein $e_A$ is the distance from the effective end of the lip to the end adjuster on the lip whose end adjuster is the furthest from the end block.

10. Apparatus according to claim 1 wherein a gasket is positioned between the extremities of the lips and the end blocks.

11. Apparatus according to claim 4 wherein a gasket is positioned between the extremities of the lips and the end blocks.

References Cited in the file of this patent

UNITED STATES PATENTS

| | | |
|---|---|---|
| 2,387,718 | Coleman | Oct. 30, 1945 |
| 2,686,931 | Knox | Aug. 24, 1954 |
| 2,821,746 | Bicher | Feb. 4, 1958 |
| 2,975,475 | Heston | Mar. 21, 1961 |